United States Patent
Kano et al.

(10) Patent No.: US 6,736,101 B2
(45) Date of Patent: May 18, 2004

(54) LOW FRICTION SLIDING ELEMENT FOR A RECIPROCATING ENGINE

(75) Inventors: Makoto Kano, Yokohama (JP); Yoshiteru Yasuda, Yokohama (JP); Masahiro Omata, Kanagawa (JP); Tokio Sakane, Yokohama (JP); Kenshi Ushijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 206 days.

(21) Appl. No.: 10/058,286

(22) Filed: Jan. 30, 2002

(65) Prior Publication Data

US 2002/0148430 A1 Oct. 17, 2002

(30) Foreign Application Priority Data

Feb. 9, 2001 (JP) ........................................ 2001-033277

(51) Int. Cl.$^7$ ............................... F02F 1/20; F01M 9/10
(52) U.S. Cl. ............................... 123/193.2; 123/193.6; 123/188.9; 123/188.11
(58) Field of Search .................... 123/193.1, 193.5, 123/193.6, 193.2, 188.9, 188.11; 29/888.06, 888.061; 384/193

(56) References Cited

U.S. PATENT DOCUMENTS

| | | | | |
|---|---|---|---|---|
| 3,657,078 A | * | 4/1972 | Schweikher | 123/193.2 |
| 3,808,955 A | * | 5/1974 | Hamada et al. | 123/193.2 |
| 3,932,228 A | * | 1/1976 | Sugiyama et al. | 123/193.2 |
| 4,834,400 A |   | 5/1989 | Lebeck | |
| 4,987,865 A | * | 1/1991 | Schenkel | 123/193.6 |
| 5,549,086 A | * | 8/1996 | Ozawa et al. | 123/193.6 |
| 5,630,953 A |   | 5/1997 | Klink | |
| 5,931,038 A | * | 8/1999 | Higashi | 123/193.2 |
| 6,041,749 A | * | 3/2000 | Lubbing et al. | 123/193.2 |
| 6,059,460 A |   | 5/2000 | Ono et al. | |
| 6,095,107 A | * | 8/2000 | Kloft et al. | 123/193.2 |
| 6,095,690 A |   | 8/2000 | Niegel et al. | |

FOREIGN PATENT DOCUMENTS

| | | |
|---|---|---|
| EP | 0 529 327 A1 | 3/1993 |
| EP | 0 661 470 A2 | 7/1995 |

OTHER PUBLICATIONS

U.S. Patent application Ser. No. 09/986,603, Ushijima et al., filed Nov. 9, 2001.

"Surface Roughness– Definitions and Designation," *Japanese Industrial Standard*, B 0601, Japanese Standards Association, pp. 1–26, 1994.

"Carbon Steels for Machine Structural Use," *Japanese Industrial Standard*, G 4051, Japanese Standards Association, pp. 1–11, 1979.

"Engine Oil Viscosity Classification—SAE J300, Revised Apr. 1997" and "API Service Categories and ILSAC Standards Engine Test Limits," 1999 Classifications and Specifications: Automotive Lubricants.

* cited by examiner

*Primary Examiner*—Marguerite McMahon
(74) *Attorney, Agent, or Firm*—Foley & Lardner

(57) ABSTRACT

A low friction sliding element for reciprocating engine parts, including a sliding contact surface that is in sliding contact with a counterpart during relative sliding motion of the sliding element and the counterpart. The sliding contact surface has microscopic recesses and plateaus interrupted by the recesses. The recesses have depths regularly varying in a sliding direction of the sliding element.

21 Claims, 4 Drawing Sheets

LOW FRICTION SLIDING ELEMENT FOR A RECIPROCATING ENGINE

BACKGROUND OF THE INVENTION

The present invention relates to a friction reduction technology for machine parts which aims at reducing friction by forming microscopic recesses on a sliding contact surface of the machine parts. Specifically, this invention relates to a low friction element capable of reducing friction loss in engine parts for automobiles.

There has been proposed a surface microstructure in which microscopic recesses or grooves are formed on a sliding contact surface of a sliding element slidable relative to a counterpart via lubricating oil, in order to reduce friction caused therebetween.

SUMMARY OF THE INVENTION

In the surface microstructure of the sliding contact surface of the sliding element in an earlier technology, microscopic recesses or grooves have a uniform depth. In this case, when a great change in condition of friction between the sliding contact surface of the sliding element and the corresponding sliding contact surface of the counterpart, for instance, sliding velocity of the sliding element or shear rate of the oil film formed between the sliding contact surfaces, occurs at the sliding contact surface that comes into sliding contact with the corresponding surface of the counterpart upon the sliding motion of the sliding element relative to the counterpart, oil retention capacity and oil film thickness on the sliding contact surface cannot be optimally controlled. Specifically, in the case of a reciprocating sliding element, at a mid-point of the sliding stroke in which the sliding velocity becomes high, a lubricating oil film formed on the sliding contact surface is subjected to shear strain at high speed at microscopic projections formed between the recesses. This causes shear loss in the oil film to thereby increase friction loss. Further, the sliding velocity becomes zero at both ends of the sliding stroke, namely, a turning point of the reciprocating motion of the sliding element. Therefore, at the both ends of the sliding stroke, the lubricating oil is prevented from being brought onto the sliding contact surface and allowed to run away through the recesses. This causes lack of the oil on the sliding contact surface, so that the effect of friction reduction is restricted. There is a demand to eliminate the above-described problems in the earlier technology. Meanwhile, it has been considered that in a case where a piston has a smooth sliding contact surface and a cylinder wall has a smooth sliding contact surface defining a cylinder bore, friction caused therebetween will be restricted to the minimum, while the oil retention property of the smooth sliding contact surfaces will be deteriorated to thereby cause seizure of the smooth sliding contact surfaces.

An object of the present invention is to provide a low friction sliding element capable of reducing friction loss at a mid-point of the sliding stroke and preventing lack of lubricating oil at both ends of the sliding stroke, which can be utilized for reciprocating parts of engines, for instance, a piston, a cylinder wall and a valve lifter.

According to one aspect of the present invention, there is provided a low friction sliding element for cooperating with a counterpart to make a relative sliding motion, the sliding element comprising:

a sliding contact surface having microscopic recesses and plateaus interrupted by the recesses, the sliding contact surface being adapted to be in sliding contact with the counterpart during the relative sliding motion, the recesses having depths regularly varying in a predetermined direction.

Preferably, each of the plateaus of the sliding contact surface of the sliding element of the present invention has a surface having an arithmetical mean roughness Ra of not more than 0.3 µm. The arithmetical mean roughness Ra may be not less than 0.01 µm. The arithmetical mean roughness Ra is prescribed in JIS B 0601-1994. The sliding contact surface of the sliding element is adapted to be lubricated with a lubricating oil. Further, a ratio of a maximum depth of the recesses of the sliding contact surface of the sliding element to a minimum depth of the recesses thereof may be not less than two.

The predetermined direction in which the depths of the recesses regularly vary may be a sliding direction of the sliding element. The recesses of the sliding contact surface of the sliding element of the present invention may be in the form of grooves extending perpendicular to the sliding direction of the sliding element. The recesses and the plateaus have widths extending on a center line of a roughness curve of the sliding contact surface, respectively. A ratio of the width of each recess to the width of each plateau may be not less than 1/10. The ratio of the width of the recess to the width of the plateau may be within a range of 1/5 to 5 at a predetermined portion of the sliding contact surface in which maximum sliding friction is caused. The predetermined portion of the sliding contact surface corresponds to a mid-point of a stroke of the sliding element. Further, a ratio of a maximum depth of the recesses to a thickness of the lubricating oil film formed on the plateaus is preferably within a range of 2 to 10 at the predetermined portion of the sliding contact surface. The maximum depth of the recesses may be within a range of 5 to 30 µm. The depths of the recesses may be maximum at the predetermined portion of the sliding contact surface, and be gradually decreased as the recesses are further apart from the predetermined portion of the sliding contact surface. Further, the recesses may be formed between opposed end portions of the sliding contact surface which are located in the predetermined direction, and the depths of the recesses may be gradually increased from near the opposed ends of the sliding contact surface toward the predetermined portion of the sliding contact surface. The opposed end portions of the sliding contact surface may correspond to both ends of the stroke of the sliding element.

Further, a sliding contact surface of the counterpart may have an arithmetical mean roughness Ra of not more than 0.3 µm. The arithmetical mean roughness Ra of the sliding contact surface of the counterpart is not less than 0.1 µm. Furthermore, the sliding element of the present invention may be applied to engine parts including a piston skirt for an engine, an engine cylinder wall defining a cylinder bore, a cylinder liner for an engine cylinder, and a valve lifter for an engine valve.

DETAILED DESCRIPTION OF THE INVENTION

A low friction sliding element of a preferred embodiment, according to the present invention, will be explained hereinafter. The low friction sliding element has a sliding contact surface that is in sliding contact with a sliding contact surface of a counterpart via lubricating oil during relative sliding motion of the sliding element and the counterpart. The sliding contact surface of the low friction sliding element has a microstructure that is adapted to exhibit a significant friction-reduction effect under relatively good lubricating condition, as compared with a so-called smooth sliding contact surface generally considered to have a minimum friction coefficient.

Figure 1:
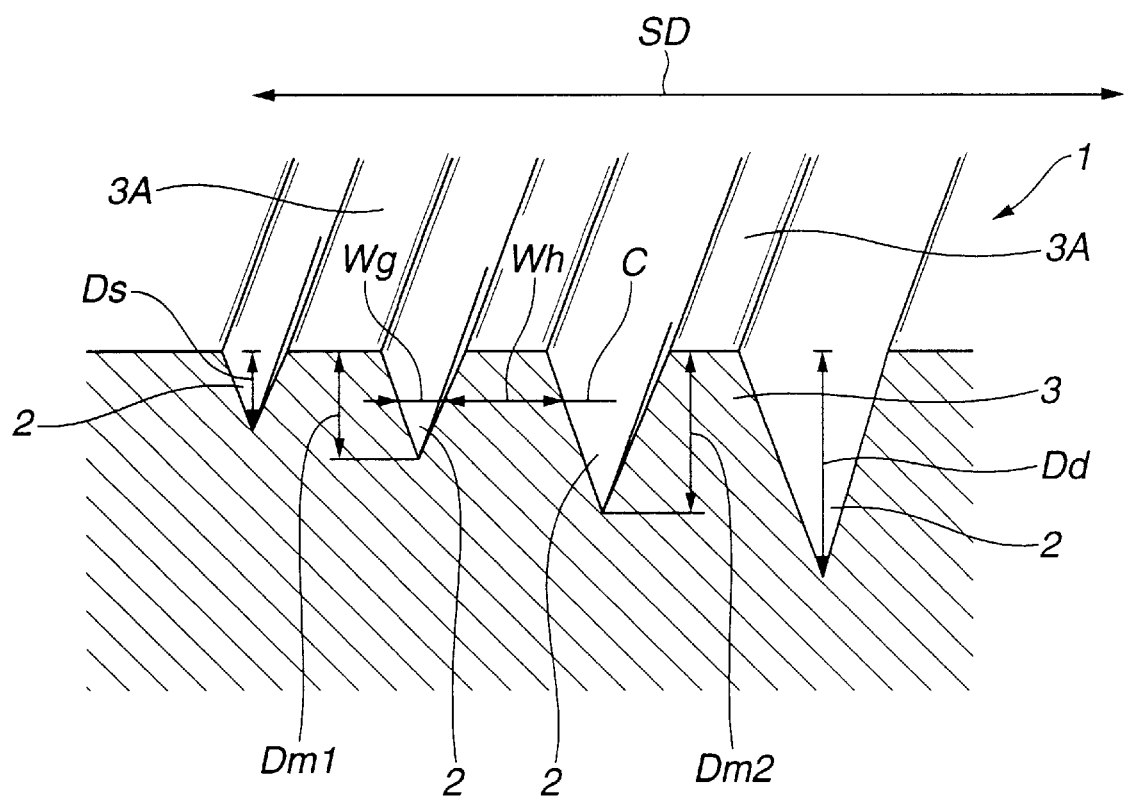
FIG. 1 is a schematic perspective view of a microstructure of a sliding contact surface of a low friction sliding element of a preferred embodiment of the present invention.

Referring now to FIG. 1, the low friction sliding element of the embodiment is explained. As illustrated in FIG. 1, the low friction sliding element has sliding contact surface 1 having a plurality of microscopic recesses 2 and a plurality of plateaus 3 interrupted by recesses 2, 2. Namely, recess 2 and plateau 3 are alternately arranged. Plateaus 3 have flat top surfaces flush with each other. Recesses 2 have depths regularly varying in sliding direction SD of the sliding element relative to a counterpart (not shown). Here, the depth of each recess 2 means a distance between a bottom of recess 2 and an imaginary plane formed by top surfaces of plateaus 3. Specifically, as shown in FIG. 1, recesses 2 have maximum depth Dd, minimum depth Ds and medium depths Dm1, Dm2 between maximum and minimum depths Dd and Ds gradually varying in sliding direction SD. Recesses 2 have function of retaining the lubricating oil. With the arrangement of recesses 2, sliding contact surface 1 can ensure the oil retention capacity and the thickness of the oil film formed thereon at optimal values corresponding to change in sliding velocity of the sliding element or shear rate of the oil film. Therefore, friction caused on sliding contact surface 1 can be significantly reduced as compared with an extremely smooth sliding contact surface formed by superfinishing.

The top surface of each plateau 3 preferably has an arithmetical mean roughness Ra of not more than 0.3 μm. The arithmetical mean roughness Ra is prescribed in JIS B 0601-1994. If the top surface of plateau 3 has an arithmetical mean roughness Ra of more than 0.3 μm, there will occur metal-to-metal contact between sliding contact surface 1 and the sliding contact surface of the counterpart when the sliding element slidingly moves relative to the counterpart. This causes deterioration of the effect of friction reduction. Further, if the top surface of plateau 3 has an arithmetical mean roughness Ra of less than 0.01 μm, the effect of friction reduction will not be enhanced more than the case of the arithmetical mean roughness Ra ranging from 0.01 μm to 0.3 μm.

A lubricating oil for lubricating the low friction sliding element of the invention may be an engine oil and a transmission oil. The sliding element can exhibit the effect of friction reduction upon being lubricated with the lubricating oil.

A ratio of maximum depth Dd of recesses 2 to minimum depth Ds of recesses 2 is preferably not less than two from the viewpoint of improvement in friction reduction. If the ratio of maximum depth Dd to minimum depth Ds is less than two, maximum depth Dd and minimum depth Ds are closer to each other. In this case, if minimum depth Ds and maximum depth Dd are relatively small, the effect of friction reduction will not be explicitly exhibited at a mid-point of the sliding stroke where the sliding velocity becomes high. Conversely, if minimum depth Ds and maximum depth Dd are relatively large, the oil film will be eliminated at both ends of the sliding stroke. Furthermore, even if the ratio of maximum depth Dd to minimum depth Ds is not less than ten, the effect of friction reduction cannot be further improved though it depends on sliding condition of the sliding element or absolute value of maximum depth Dd.

In this embodiment, recesses 2 separated from each other are in the form of grooves extending in a direction perpendicular to sliding direction SD as shown in FIG. 1. Groove-shaped recesses 2 can serve for facilitating discharge of the lubricating oil at the mid-point of the sliding stroke where the sliding velocity becomes high. The effect of friction reduction, therefore, can be enhanced as a whole. Further, owing to the direction of the grooves, the oil is allowed to be brought onto plateaus 3 upon sliding motion of the sliding element relative to the counterpart. This can provide stable fluid lubrication to the sliding element under engine operation condition varying from low-speed range to high-speed range. Especially, in a case where the sliding element is applied to an engine piston skirt or an engine cylinder wall defining a cylinder bore, an engine oil can be retained by the grooves of the sliding contact surface thereof and the oil film can be stably formed on the plateaus of the sliding contact surface thereof. This can prevent seizure of the sliding contact surface of the piston skirt or the cylinder wall relative to the corresponding sliding contact surface of a counterpart, namely, an engine cylinder wall or an engine piston skirt. The piston skirt or the cylinder wall to which the sliding element of the present invention is applied can exhibit excellent anti-seizure property.

Each recess 2 formed into a groove has width Wg extending on center line C of a roughness curve of sliding contact surface 1. Each plateau 3 has width Wh extending on center line C of the roughness curve of sliding contact surface 1. Ratio Wg/Wh of width Wg of recess (groove) 2 to width Wh of plateau 3 is preferably not less than ⅒. If ratio Wg/Wh is less than ⅒, the oil retention effect of the grooves and the oil discharge effect thereof cannot be sufficiently obtained so that the effect of friction reduction will decrease. Further, ratio Wg/Wh may be within a range of ⅕ to 5 at a predetermined portion of the sliding contact surface in which maximum sliding friction is caused. Specifically, the maximum sliding friction is caused at the mid-point of the sliding stroke where the sliding speed becomes high. If ratio Wg/Wh is less than ⅕ at the mid-point of the sliding stroke, the oil retention effect and the oil discharge effect cannot be sufficiently obtained. If ratio Wg/Wh exceeds ⅕ at the mid-point of the sliding stroke, load-resistant capability of plateaus 3 will be deteriorated to thereby cause wear on plateaus 3.

Ratio Dd/hc of maximum depth Dd of recesses (grooves) 2 to thickness hc of a lubricating oil film formed on plateaus 3 may be within a range of 2 to 10 at the predetermined portion of the sliding contact surface where maximum sliding friction is caused. Here, thickness hc is a calculated value of thickness of the lubricating oil film formed on plateaus 3. Owing to the relationship between maximum depth Dd of recesses (grooves) 2 and thickness hc of the oil film, discharge of the oil can be suitably controlled to thereby enhance the effect of friction reduction of the sliding element. If ratio Dd/hc is less than 2, the oil discharge effect will be deteriorated to thereby lessen the effect of friction reduction. Conversely, if ratio Dd/hc is more than 10, an amount of the oil discharged will excessively increase so that the oil film having a sufficient thickness will not be formed on plateaus 3. Further, maximum depth Dd of recesses (grooves) 2 may be within a range of 5 to 30 μm. If maximum depth Dd of recesses (grooves) 2 is smaller than 5 μm, the oil retention effect and the oil discharge effect will be deteriorated so that the effect of friction reduction will be lessened. If maximum depth Dd of recesses (grooves) 2 is larger than 30 μm, the oil discharge amount will excessively increase to thereby cause an insufficient thickness of the oil film formed on plateaus 3. Meanwhile, in a case where the sliding element of the present invention is applied to engine parts, such as a piston and a cylinder wall, for automobiles which are used under condition that an engine revolution number, an engine oil viscosity, and a calculated value of oil film thickness hc are largely changed, ratio Dd/hc may be given high priority.

Further, recesses (grooves) 2 are formed between opposed end portions of the sliding contact surface which are located in sliding direction SD. The opposed end portions of the sliding contact surface correspond to both ends of the sliding stroke. Recesses (grooves) 2 are preferably positioned slightly inside the opposed end portions of the sliding contact surface. This is because a sliding tangent, that means a tangent to the sliding contact surface in the sliding direction, terminates at the both ends of the sliding stroke so that the oil film is prevented from being brought to the opposed end portions of the sliding contact surface. This causes wear at the opposed end portions of the sliding contact surface. Therefore, even when recesses (grooves) 2 are formed at the opposed end portions of the sliding contact surface, recesses (grooves) 2 will be worn out in a relatively short period. Furthermore, preferably, the depths of recesses (grooves) 2 are maximum at the predetermined portion of the sliding contact surface which corresponds to the mid-point of the sliding stroke, and are gradually decreased as recesses (grooves) 2 are further apart from the predetermined portion of the sliding contact surface. Namely, the depths of the recesses (grooves) 2 are gradually increased from one of the opposed end portions of the sliding contact surface toward the predetermined portion of the sliding contact surface and then gradually decreased toward the other of the opposed end portions thereof. This is because the sliding speed of the sliding tangent gradually becomes high toward the mid-point of the sliding stroke.

The sliding element may be used in combination with a counterpart having a sliding contact surface having an arithmetical mean roughness Ra of not more than 0.3 μm. If the arithmetical mean roughness Ra is larger than 0.3 μm, metal-to-metal contact between the sliding contact surfaces will be caused depending on friction condition. Although the arithmetical mean roughness Ra is preferably smaller, the effect of friction reduction will not be further enhanced even when the arithmetical mean roughness Ra is smaller than 0.1 μm.

Figure 3:
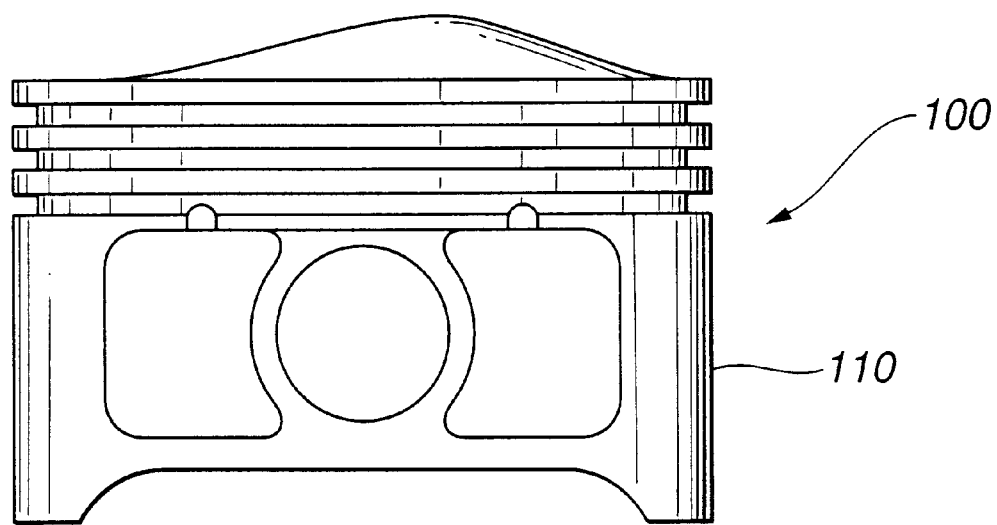
FIG. 3 is a front view of an engine piston.
Figure 4:
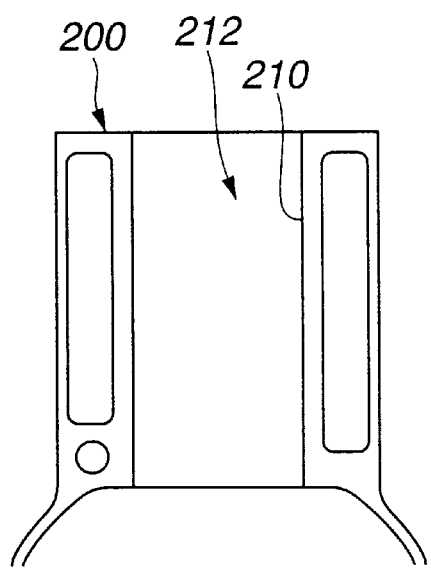
FIG. 4 is a vertical section of an engine cylinder wall.
Figure 5:
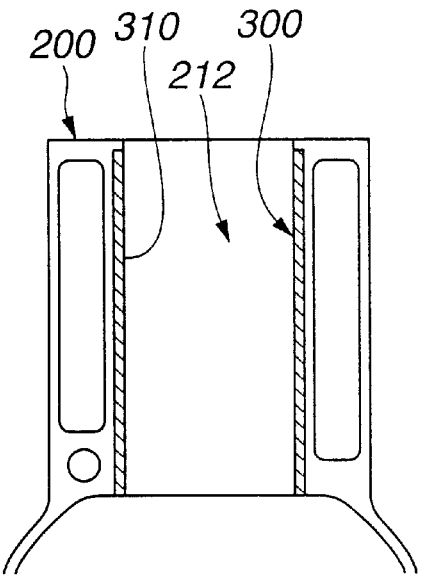
FIG. 5 is a vertical section of a cylinder liner fixed to an engine cylinder.
Figure 6:
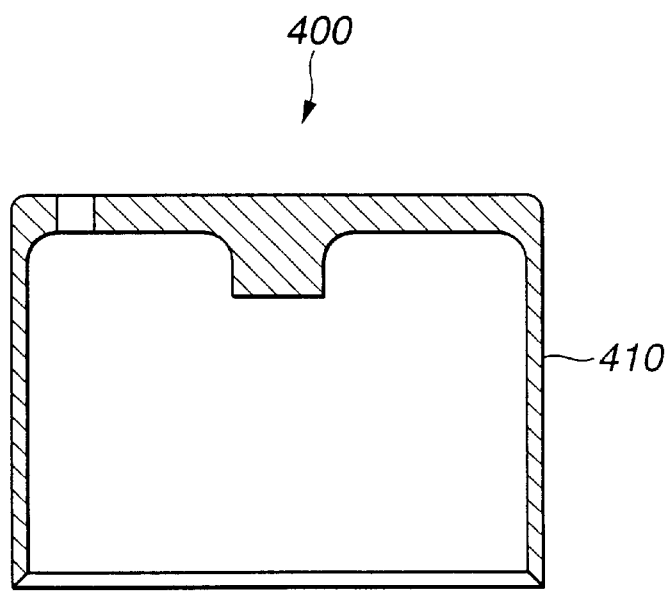
FIG. 6 is a vertical section of a valve lifter for an engine valve.

The sliding element of the present invention can be applied to various engine parts including a piston skirt, a cylinder wall defining a cylinder bore, a cylinder liner and a valve lifter. FIG. 3 shows piston skirt 110 of engine piston 100. FIG. 4 shows cylinder wall 210 of engine cylinder block 200 which defines cylinder bore 212. FIG. 5 shows cylinder liner 300 fixed into cylinder bore 212 and having sliding contact surface 310. FIG. 6 shows valve lifter 400 having side wall 410 having a sliding contact surface. Engine parts to which the sliding element of the present invention is applicable are not limited to those shown in FIGS. 3–6. Owing to the application to engine parts, friction loss and wear magnitude caused in the engine can be reduced, so that engine performance can be better maintained for a relatively long period and engine fuel economy can be remarkably improved.

EXAMPLES

The present invention is described in more detail by way of examples by referring to the accompanying drawings. However, these examples are only illustrative and not intended to limit a scope of the present invention thereto.

Examples 1–16

Specimens of a sliding element were prepared using pieces of a flat sheet made of cast iron generally used for forming an engine cylinder wall. The pieces were subjected to grinding, surface microscopic recessing, and lapping while changing the working conditions to form a sliding contact surface having properties shown in Table 1. The properties of the sliding contact surface include surface roughness Ra of the plateau top surface, ratio Dd/Ds of maximum depth Dd of the grooves to minimum depth Ds thereof, ratio Wg/Wh of groove width Wg extending on the center line of the roughness curve of the sliding contact surface to plateau width Wh extending on the center line thereof, and ratio Dd/hc of maximum depth Dd of the grooves to calculated thickness hc of the oil film formed at the mid-point of the sliding stroke. Upon the surface microscopic recessing, microscopic grooves as indicated at 2 in FIG. 1 were formed perpendicular to the sliding direction and configured in such a manner that the depths were minimum at both ends of the sliding stroke and gradually increased toward the mid-point of the sliding stroke.

Figure 2:
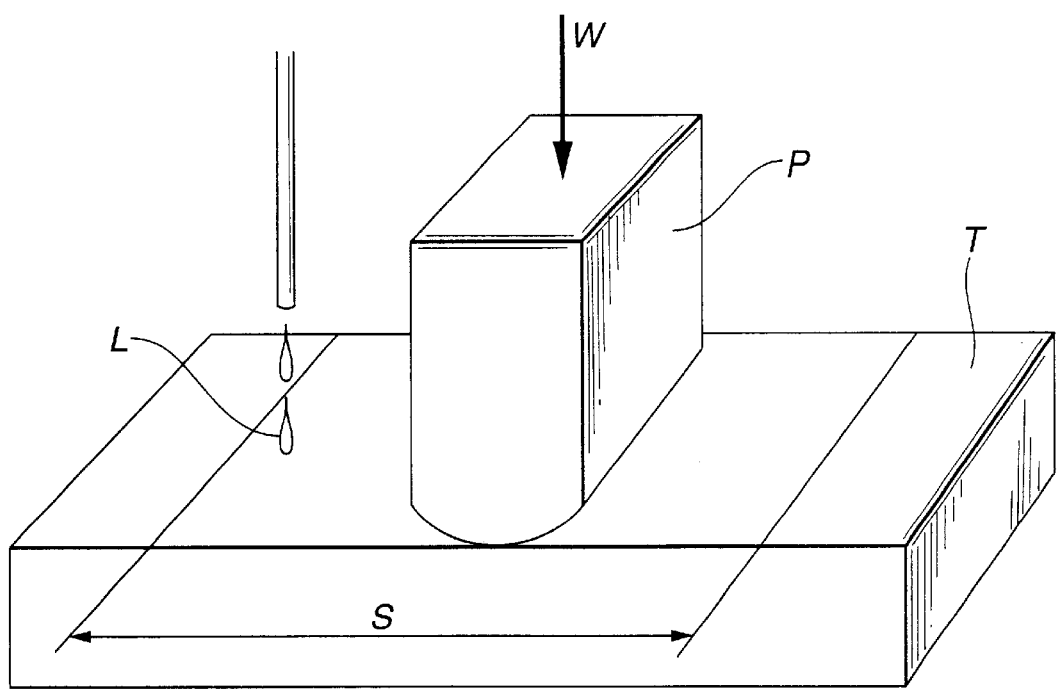
FIG. 2 is a schematic explanatory diagram showing procedure of a reciprocating slide test for evaluating the effect of friction reduction of the sliding element of the embodiment of the invention.

Next, the thus-prepared specimens were installed to a reciprocating sliding tester shown in FIG. 2 and subjected to a sliding friction test to evaluate the effect of friction reduction. As illustrated in FIG. 2, specimen T was in contact with counterpart P having a generally U-shaped contour in section. Counterpart P had a curvature R30 at a tip end thereof and a chrome plating adapted for a piston ring. While dropping engine oil L onto the sliding contact surface of specimen T, specimen T was slided relative to counterpart P in such a manner that the sliding contact surface of specimen T came into line contact with a surface of counterpart P. The test conditions were as follows.

Counterpart P: made of JIS S40C steel with chrome plating, having a R30 tip end;
Engine oil L: 5W-30 listed in "ENGINE OIL VISCOSITY CLASSIFICATION—SAE J300 revised APR97, 1999 CLASSIFICATIONS AND SPECIFICATIONS AUTOMOTIVE LUBRICANTS", SG listed in "API SERVICE CATEGORIES AND ILSAC STANDARDS ENGINE TEST LIMITS, 1999 CLASSIFICATIONS AND SPECIFICATIONS AUTOMOTIVE LUBRICANTS", by drop lubrication;
Oil temperature: 100° C.;
Load applied W: 3 kg;
Cycle: 700 rpm;
Reciprocating stroke S: 30 mm.
The test results are shown in Table 1.

Comparative Examples 1–2

Specimens were prepared in the same manner as described in Examples 1–16 except that the sliding contact surface of the specimen of Comparative Example 1 was a smooth surface having no groove, and that the sliding contact surface of the specimen of Comparative Example 2 had a cross-hatched microstructure in which V-shaped grooves having substantially same depth were formed. The thus-prepared specimens were subjected to the sliding friction test in the same manner and the same conditions as described in Examples 1–16. The test results are shown in Table 1.

TABLE 1

| | Plateau Surface Roughness Ra (µm) | Ratio Dd/Ds | Ratio Wg/Wh Min. | Ratio Wg/Wh Max. | Ratio Dd/hc |
|---|---|---|---|---|---|
| Example 1 | 0.3 | 3 | 1/4 | 1/2 | 5 |
| Example 2 | 0.1 | 3 | 1/4 | 1/2 | 5 |
| Example 3 | 0.01 | 3 | 1/4 | 1/2 | 5 |
| Example 4 | 0.1 | 2 | 1/4 | 1/3 | 5 |
| Example 5 | 0.1 | 5 | 1/4 | 1/1 | 8 |
| Example 6 | 0.1 | 3 | 1/10 | 1/5 | 6 |
| Example 7 | 0.1 | 3 | 1/3 | 1/1 | 6 |
| Example 8 | 0.1 | 3 | 1/1 | 5/1 | 6 |
| Example 9 | 0.1 | 3 | 1/4 | 1/2 | 2 |
| Example 10 | 0.1 | 3 | 1/4 | 1/1 | 10 |
| Example 11 | 0.1 | 3 | 1/4 | 1/2 | 5 |
| Example 12 | 0.4 | 3 | 1/4 | 1/2 | 5 |
| Example 13 | 0.1 | 1.5 | 1/4 | 1/2 | 5 |
| Example 14 | 0.1 | 3 | 1/20 | 1/10 | 5 |
| Example 15 | 0.1 | 3 | 1/4 | 1/2 | 1 |
| Example 16 | 0.1 | 5 | 1/1 | 5/1 | 13 |
| Comparative Example 1 | 0.05 (Smooth surface) | 1 | 1/1 | 1/1 | — |
| Comparative Example 2 | 1.2 (Cross-hatched surface) | 1 | 1/1 | 1/1 | — |

| | Groove Max. Depth Dd (µm) | Counter-part Surface Roughness Ra (µm) | Friction Coefficient (µ) at Stroke mid-point |
|---|---|---|---|
| Example 1 | 15 | 0.3 | 0.05 |
| Example 2 | 15 | 0.3 | 0.03 |
| Example 3 | 15 | 0.3 | 0.02 |
| Example 4 | 15 | 0.3 | 0.03 |
| Example 5 | 25 | 0.3 | 0.02 |
| Example 6 | 20 | 0.3 | 0.04 |
| Example 7 | 20 | 0.3 | 0.02 |
| Example 8 | 20 | 0.3 | 0.03 |
| Example 9 | 5 | 0.3 | 0.04 |
| Example 10 | 30 | 0.3 | 0.02 |
| Example 11 | 15 | 0.1 | 0.02 |
| Example 12 | 15 | 0.3 | 0.07 |
| Example 13 | 15 | 0.3 | 0.04 |
| Example 14 | 15 | 0.3 | 0.07 |
| Example 15 | 3 | 0.3 | 0.07 |
| Example 16 | 40 | 0.3 | 0.04 |
| Comparative Example 1 | — | 0.3 | 0.07 |
| Comparative Example 2 | — | 0.3 | 0.12 |

It was noted that surface roughness Ra of the plateau top surface, ratio Dd/Ds of maximum depth Dd to minimum depth Ds of the grooves, ratio Wg/Wh of groove width to plateau width, and ratio Dd/hc of maximum depth Dd of the grooves to calculated oil film thickness hc were within the predetermined preferred range in Examples 1–11. The sliding elements of Examples 1–11 had the effect of friction reduction increased by approximately 30% or more as compared with the sliding element having a so-called smooth surface similar to Comparative Example 1 which is generally regarded as being effective to reduce friction coefficient. Further, the sliding elements of Examples 1–11 had the oil retention function enhanced as compared with the sliding element having the so-called smooth surface, to thereby exhibit excellent anti-seizure property.

It was found that the sliding contact surface of the sliding element of Example 12 had a surface roughness of the plateau top surface which was larger than that of Example 1 because the sliding contact surface was not subjected to lapping. Due to the larger surface roughness of the plateau top surface, the sliding contact surface had scuffing and a relatively high friction coefficient. Further, it was found that ratio Dd/Ds of maximum depth Dd of the grooves to minimum depth Ds thereof in the sliding contact surface of the sliding element of Example 13 was the relatively small value, i.e. 1.5, so that the friction coefficient at the mid-point of the sliding stroke was slightly large. Also, in Example 13, it was noted that the depth of the grooves located near both ends of the sliding stroke at which the sliding speed was low and the oil film tended to be eliminated, was slightly large, i.e., approximately 10 µm, to thereby readily discharge the oil therefrom. As a result, scuffing was slightly caused in the sliding contact surface.

In Example 14, ratio Wg/Wh of groove width Wg extending on the center line of the roughness curve of the sliding contact surface to plateau width Wh extending on the center line thereof was relatively small, so that the friction coefficient was slightly large. In Example 15, ratio Dd/hc of maximum depth Dd of the grooves to calculated thickness hc of the oil film formed at the mid-point of the sliding stroke was slightly small. An absolute value of maximum depth Dd of the grooves was relatively small, i.e., 3 µm. The friction coefficient was slightly large. In Example 16, maximum depth Dd of the grooves was relatively large, i.e., 40 µm, so that the friction coefficient at the mid-point of the sliding stroke was slightly large. Also, in Example 16, it was noted that the depths of the grooves located near both ends of the sliding stroke were slightly large to thereby readily discharge the oil and cause a little scuffing in the sliding contact surface.

On the other hand, each of the sliding element of Comparative Example 1 which had a smooth surface, and the sliding element of Comparative Example 2 which had the large plateau surface roughness Ra, exhibited the large friction coefficient.

This application is based on a prior Japanese Patent Application No. 2001-033277 filed on February 9, 2001, the entire content of which is hereby incorporated by reference.

Although the invention has been described above by reference to a certain embodiment and examples of the invention, the invention is not limited to the certain embodiment and examples described above. Modifications and variations of the certain embodiment and examples described above will occur to those skilled in the art in light of the above teachings. The scope of the invention is defined with reference to the following claims.

What is claimed is:

1. A low friction sliding element for cooperating with a counterpart to make a relative sliding motion, the sliding element comprising:
   a sliding contact surface having microscopic recesses and plateaus interrupted by the recesses, the sliding contact surface being adapted to be in sliding contact with the counterpart during the relative sliding motion,
   the recesses having depths regularly varying in a predetermined direction.

2. The low friction sliding element as claimed in claim 1, wherein each of the plateaus has a surface having an arithmetical mean roughness Ra of not more than 0.3 µm.

3. The low friction sliding element as claimed in claim 2, wherein the arithmetical mean roughness Ra is not less than 0.01 μm.

4. The low friction sliding element as claimed in claim 1, wherein the sliding contact surface is adapted to be lubricated with a lubricating oil.

5. The low friction sliding element as claimed in claim 1, wherein a ratio of a maximum depth of the recesses to a minimum depth thereof is not less than two.

6. The low friction sliding element as claimed in claim 1, wherein the predetermined direction is a sliding direction of the sliding element.

7. The low friction sliding element as claimed in claim 6, wherein the recesses are in the form of grooves extending perpendicular to the sliding direction.

8. The low friction sliding element as claimed in claim 1, wherein each recess has a width Wg extending on a center line of a roughness curve of the sliding contact surface, and each plateau has a width Wh extending on the center line thereof, a ratio of the width Wg to the width Wh being not less than 1/10.

9. The low friction sliding element as claimed in claim 8, wherein the ratio of the width Wg to the width Wh is within a range of 1/5 to 5 at a predetermined portion of the sliding contact surface in which maximum sliding friction is caused.

10. The low friction sliding element as claimed in claim 4, wherein a ratio of a maximum depth of the recesses to a thickness of the lubricating oil film formed on the plateaus is within a range of 2 to 10 at a predetermined portion of the sliding contact surface in which maximum sliding friction is caused.

11. The low friction sliding element as claimed in claim 10, wherein the maximum depth of the recesses is within a range of 5 to 30 μm.

12. The low friction sliding element as claimed in claim 1, wherein the depths of the recesses are maximum at a predetermined portion of the sliding contact surface in which maximum sliding friction is caused, the depths of the recesses being gradually decreased as the recesses are further apart from the predetermined portion of the sliding contact surface.

13. The low friction sliding element as claimed in claim 12, wherein the predetermined portion of the sliding contact surface corresponds to a mid-point of a stroke of the sliding element.

14. The low friction sliding element as claimed in claim 1, wherein the recesses are formed between opposed end portions of the sliding contact surface which are located in the predetermined direction, the depths of the recesses being gradually increased from near the opposed ends of the sliding contact surface toward a predetermined portion of the sliding contact surface in which maximum sliding friction is caused.

15. The low friction sliding element as claimed in claim 14, wherein the opposed end portions of the sliding contact surface correspond to both ends of a stroke of the sliding element, the predetermined portion of the sliding contact surface corresponding to a mid-point of the stroke thereof.

16. The low friction sliding element as claimed in claim 1, wherein the counterpart has a sliding contact surface having an arithmetical mean roughness Ra of not more than 0.3 μm.

17. The low friction sliding element as claimed in claim 1, wherein the arithmetical mean roughness Ra of the sliding contact surface of the counterpart is not less than 0.1 μm.

18. The low friction sliding element as claimed in claim 1, wherein the sliding element is a piston skirt for an engine.

19. The low friction sliding element as claimed in claim 1, wherein the sliding element is an engine cylinder wall defining a cylinder bore.

20. The low friction sliding element as claimed in claim 1, wherein the sliding element is a cylinder liner for an engine cylinder.

21. The low friction sliding element as claimed in claim 1, wherein the sliding element is a valve lifter for an engine valve.

* * * * *